Figure 1:
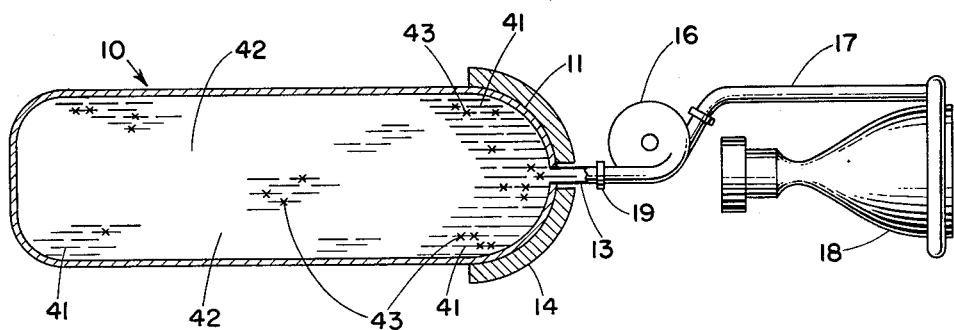

July 5, 1966    S. S. PAPELL    3,258,918
FLUID DISPENSING APPARATUS AND METHOD
Filed Nov. 17, 1964

INVENTOR
SOLOMON S. PAPELL

BY

ATTORNEYS

United States Patent Office 3,258,918
Patented July 5, 1966

3,258,918
FLUID DISPENSING APPARATUS AND METHOD
Solomon S. Papell, Berea, Ohio, assignor to the United States of America as represented by the Administrator of the National Aeronautics and Space Administration
Filed Nov. 17, 1964, Ser. No. 411,949
13 Claims. (Cl. 60—39.46)

The invention described herein may be manufactured and used by or for the Government of the United States of America for governmental purposes without the payment of any royalties thereon or therefor.

This is a continuation-in-part of application Serial No. 315,096 filed Oct. 9, 1963.

The present invention relates, generally, to fluid transferring apparatus and more particularly to a feed system and method for transferring the liquid phase of a fluid under zero gravity condition.

As the exploration and activity of man in space has enlarged, the questions associated with the behavior of rocket engine propellants, stored in space vehicle tanks while exposed to weightlessness (zero gravity), has become increasingly important. Since the force of gravity decreases as the rocket vehicle penetrates further into space, the liquid and vaporous phases of the rocket propellant are free to disperse throughout the tank, causing a disoriented condition. From this ensues a multitude of problems. These include, for example, effective tank venting, proper propellant pump inlet design to eliminate cavitation and surging, and effective orientation control of the liquid propellant at the pump inlet to give the rocket system restart capability. The rocket propellant liquid and vapor could, of course, be separated and positioned by means of acceleration fields, such as spinning the tank or accelerating (ullage) rockets; but these methods require relatively high energy levels and complex control mechanisms, and they are otherwise undesirable, especially for large vehicles. Other devices for performing this function suffer from shortcomings due to their inherent nature. An expulsion bag technique, using a pressurized system, has been proposed. However, this would appear to be unreliable because of possible bag rupture. Surface tension baffles located over the pump inlet could be unreliable because of the possible accumulation of vapor over extended periods of time. Auxiliary solid propellant rockets on the vehicle fired to separate the liquid and vapor states in the propellant tanks require additional weight and added complexity.

The general purpose of this invention is to provide for a new and improved apparatus and method for separating and orienting the liquid and vapor phases of a liquid propellant in a zero gravity condition which possesses none of the aforedescribed disadvantages. To attain this, the present invention involves a unique method and apparatus for use with a liquid propellant having magnetic particles dispersed therein, wherein proper orienting of said liquid and vapor phases is obtained by magnetic attraction.

Accordingly, it is an object of the present invention to provide for a new and novel method and apparatus for dispensing a liquid material.

Another object of this invention is to provide for a new and novel method and apparatus for dispensing a liquid material in a zero gravity environment.

Yet still another object of this invention is to provide for an apparatus and method for separating and orienting the liquid and vapor phases of a fluid in a zero gravity environment.

Another object of this invention is to provide for an apparatus for separating and orienting the liquid and vapor phases of a propellant in a feed system under zero gravity environment.

Another object of this invention is to provide for a new and improved method and apparatus for attracting the liquid phase of a propellant to the pump inlet in a feed system for a rocket engine in a zero gravity environment.

Still another object of this invention is to provide for a new and improved method and apparatus for use in a propellant feed system for restarting a rocket engine in a zero gravity environment.

Figure 2:
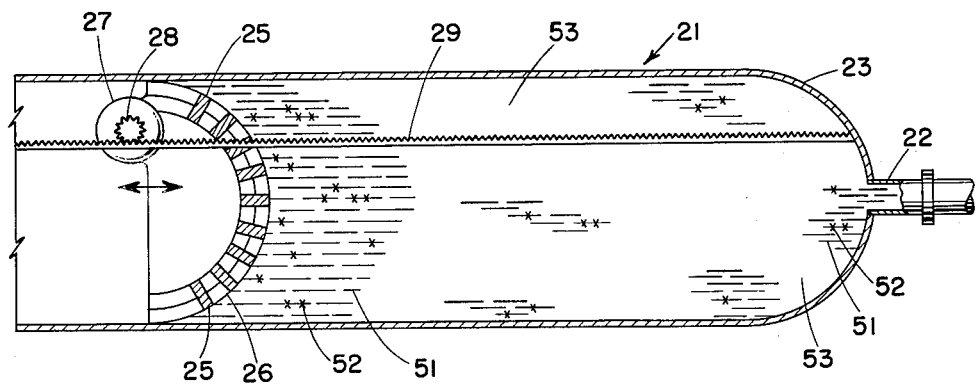

Other objects and many of the attended advantages of this invention will be readily appreciated as the same becomes better understood by reference to the following detailed description when considered in connection with the accompanying drawings in which like reference numerals designate like parts throughout the figures thereof and wherein:

FIG. 1 is an elevation view partly in section of one embodiment of the invention and FIG. 2 is an elevation view partly in section of another embodiment of the invention.

According to the present invention, the foregoing and other objects are obtained by magnetically separating and orienting the liquid and vapor phases of the fluid material. To accomplish this, magnetic particles are dispersed throughout the fluid propellant and colloidally suspended therein, and by utilizing particles of submicron size, the surface area of each particle is extremely large in relation to its mass. Because of the small particle size and large surface area, the particles attract and hold the molecules of the propellant by surface tension and adsorption, thereby assuring that the magnetized particles cannot settle out of the fluid propellant. Additionally, because of the relatively small amount of magnetic material present, the propellant forms a major constituent of the colloid to provide low viscosity, easy flowability and low energy penalty due to the introduction of said non-combustible particles. As the magnetic particles adhere to the liquid portion of the fluid, said liquid portion can thereby be attracted by means of magnets and hence separated and oriented from the vapor phase of said fluid material.

Referring now to the drawings, wherein like reference characters designate like or corresponding parts throughout the several views, there is shown in FIG. 1 a fluid feed system for supplying a liquid propellant to a rocket engine, the rocket being designated by reference numeral 18. The system includes a means for supplying a source of fluid propellant such as the tank 10. In the embodiment shown, the tank 10 is generally cylindrical and has a substantially concave or dished end portion 11. The tank 10 is further provided with an outlet 13 located at the end portion 11 through which the propellant passes. Connected to the outlet 13 is a propellant pump 16 and connected to the other end of the pump 16 is a discharge line 17 leading to an injector face (not shown) in a rocket engine 18.

In order to effectively transmit the liquid portion of the propellant from the pump 16 it is necessary that only the liquid phase of the propellant be attracted to an inlet 19 in the pump. This is accomplished by means of a magnet 14. In the embodiment shown, the magnet 14 is positioned adjacent the junction of the tank outlet 13 and the pump inlet 19. The magnet 14 can either be a permanent magnet or, if power is available, an electromagnet.

Once the liquid phase of the propellant is oriented and positioned at the pump inlet, it can be effectively transmitted through said pump to the rocket engine. The feed system need not include a pump, it only being necessary that the magnet be positioned at a location or zone portion within the feed system at which it is desired to attract only the liquid phase of the fluid. In the embodiment shown, a quantity of fluid propellant is disposed within the tank 10, said propellant including a liquid phase 41 and a vapor phase 42. Magnetic particles 43 are disepersed in colloidal suspension in the liquid phase 41.

In operation, the magnet 14 attracts the magnetic particles 43 and thereby attract the liquid phase 41 of the propellant to the desired zone portion.

In FIG. 2 is shown another embodiment of the invention having a magnetic means that includes a movable magnet assembly. This embodiment includes a means such as a cylindrical tank 21 for holding a quantity of fluid and having an outlet 22 through which the fluid is dispensed. The zone portion of the feed system, that is the portion of the feed system leading from the tank 21 to the rocket engine, is essentially the same as the embodiment shown in FIG. 1 and has been omitted for purposes of simplicity. An end portion 23 of the tank member 21 at which the outlet 22 is located is substantially concave or dish shaped. The movable magnet assembly includes at least one magnet 25 mounted on a frame member 26 which is mounted for movement along the longitudinal axis of the tank member 21. The movable magnet assembly also includes means for moving the frame member 26. In the embodiment shown, said means includes a motor 27 to which the frame member 26 is attached. Said motor 27 includes a toothed wheel or gear 28 which is mounted for movement on a bar or rail member 29 which is longitudinally disposed within the tank member 21. The means for moving the frame member 26 need not be located within the tank member 21 but could be external thereto. Similarly, the frame member to which the magnets 25 are attached could be located external to the tank member 21. In the embodiment shown, the frame member 26 is in the form of a hemispherical grating or screen which has a cross-sectional diameter substantially equal to the cross-sectional diameter of the cylinder and shaped so as to conform to the shape of the end portion 23 of the cylinder 21. Disposed within the cylindrical tank 21 is a quantity of fluid propellant comprising a liquid portion 51 and a vapor portion 53. Disposed in colloidal suspension in the liquid portion 51 is a quantity of magnetic particles 52.

This embodiment operates in the following manner. When a start-up is required at zero gravity environment, frame member 26 is moved from the end of the cylinder remote from the outlet 22 toward said outlet 22 whereby the liquid portion 51 of the propellant containing magnetic particle 52 is raked up by the frame member 26 and attracted and oriented toward the tank outlet 22. After the engine starts, the frame member can be returned to the opposite end of the tank to reduce pumping losses.

Obviously, many modifications and variations of the present invention are possible in light of the above teachings. It is therefore, to be understood that within the scope of the apended claims, the invention may be practiced other than as specifically described.

I claim:

1. Apparatus for use in dispensing a quantity of magnetic material comprising a tank for holding said material, said tank having an outlet, a bar mounted within said tank adjacent to said outlet and extending inwardly therefrom, a frame member movably mounted on said bar, at least one magnet mounted on said frame member, means for moving said frame member along said bar, whereby said magnet can attract and move said magnetic material toward said outlet to be dispensed through the same.

2. In a space vehicle propellant feed system for transmitting a magnetic liquid propellant from a source to a combustion chamber, said system having a tank for holding the propellant, an outlet on said tank through which the propellant is dispensed, a pump connected to said tank for pumping the propellant from the tank and a line connected to the pump for transmitting the propellant to the vehicle combustion chamber, the improvement comprising a magnetic means for attracting the liquid portion of the magnetic fluid towards said outlet whereby said liquid portion can be more easily pumped to said combustion chamber when in a zero gravity environment.

3. The improvement according to claim 2 wherein said magnetic means is a permanent magnet.

4. The improvement according to claim 2 wherein said magnetic means is an electromagnet.

5. The improvement according to claim 2 wherein said magnetic means is a permanent magnet positioned adjacent to said outlet.

6. The improvement according to claim 2 wherein said magnetic means is movable within said feed system.

7. The improvement according to claim 2 wherein said magnetic means comprises a bar mounted within said tank member adjacent to said outlet and extending inwardly therefrom, a frame member movably mounted on said bar member, at least one magnet mounted on said frame member, means for moving said frame member along said bar member, whereby said magnetic member can attract said magnetic fluid and move said magnetic fluid towards said outlet and thereby enable the pump to transmit said fluid to said combustion chamber.

8. In a propellant feed system for a vehicle operable in a zero gravity environment, wherein said propellant includes a liquid phase and a vapor phase, said feed system including a zone portion through which it is desired to transmit only the liquid phase of said propellant, means within said system for supplying a magnetic propellant and magnetic means cooperating with said magnetic propellant for attracting the liquid phase of said propellant to said zone portion.

9. An improvement in a method of transmitting, in a vehicle in a zero gravity environment, the liquid phase of a supply of liquid propellant from a source thereof to a desired zone portion in the feed system, said liquid propellant having magnetic particles dispensed therein, the improvement comprising attracting magnetically the magnetic particles to said zone portion whereby the liquid phase of the propellant held to the magnetic particles will also be transmitted to zaid zone portion.

10. Apparatus for use in dispensing a quantity of magnetic material comprising a tank for holding said material, said tank having an outlet, and magnetic means for attracting said magnetic material to said outlet, said magnetic means being movable with respect to said tank, whereby said material can be dispensed through said outlet.

11. Apparatus according to claim 10 wherein said magnetic means is an electromagnet.

12. Apparatus according to claim 10 wherein said magnetic means is a permanent magnet.

13. Apparatus according to claim 10 wherein said magnetic means is positioned adjacent to said outlet.

References Cited by the Examiner

UNITED STATES PATENTS

| | | | |
|---|---|---|---|
| 3,023,902 | 3/1962 | Harvengt | 209—496 X |
| 3,067,131 | 12/1962 | Bergstrom | 55—3 X |
| 3,202,160 | 8/1965 | Barger | 137—1 |

MARK NEWMAN, *Primary Examiner.*

D. HART, *Assistant Examiner.*